Aug. 21, 1956 W. L. KNOWLES 2,759,506
ROTARY MACHINE FOR MAKING CORRUGATED WOOD
Filed Nov. 10, 1953 3 Sheets-Sheet 1
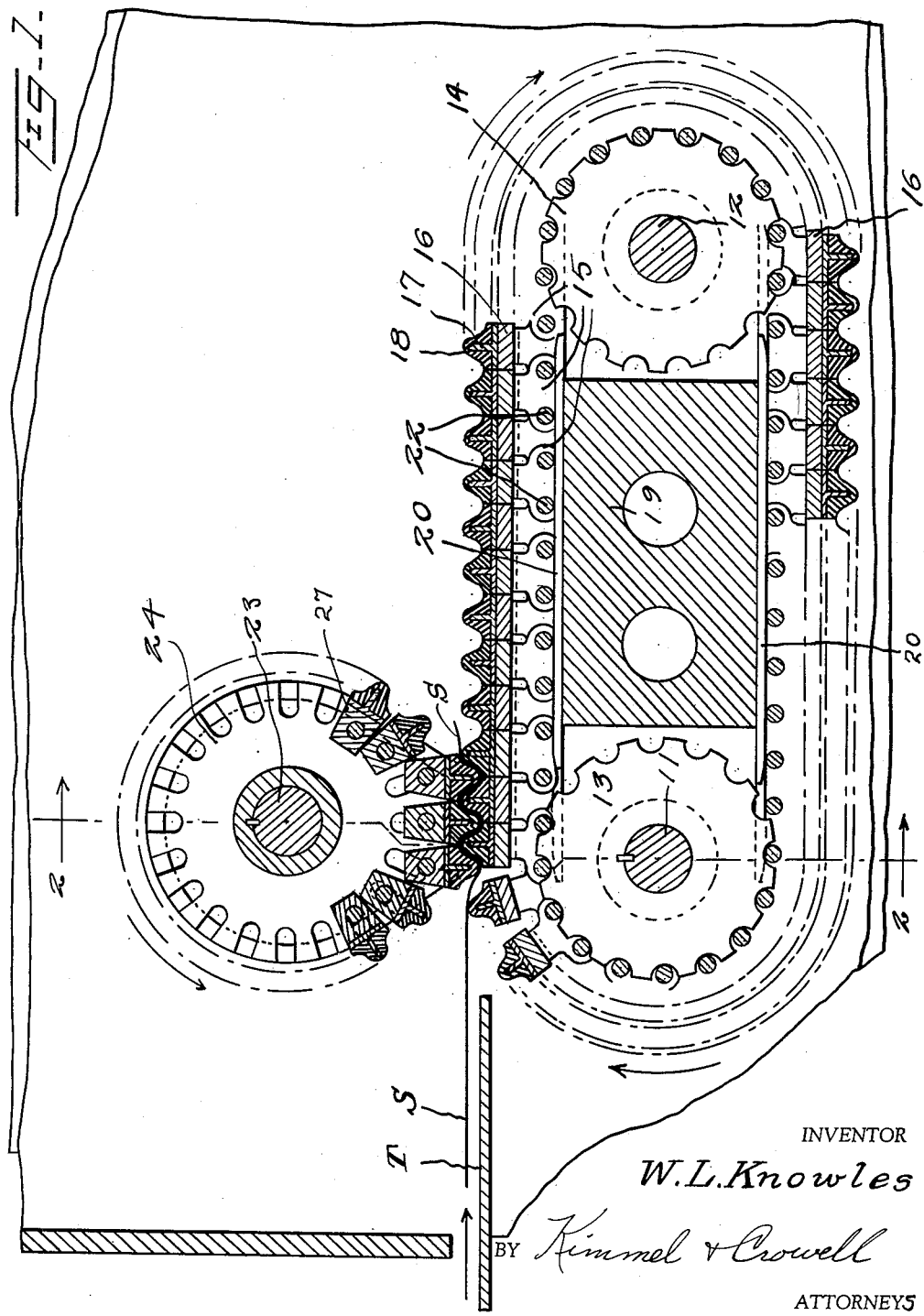
INVENTOR
W. L. Knowles
BY Kimmel & Crowell
ATTORNEYS

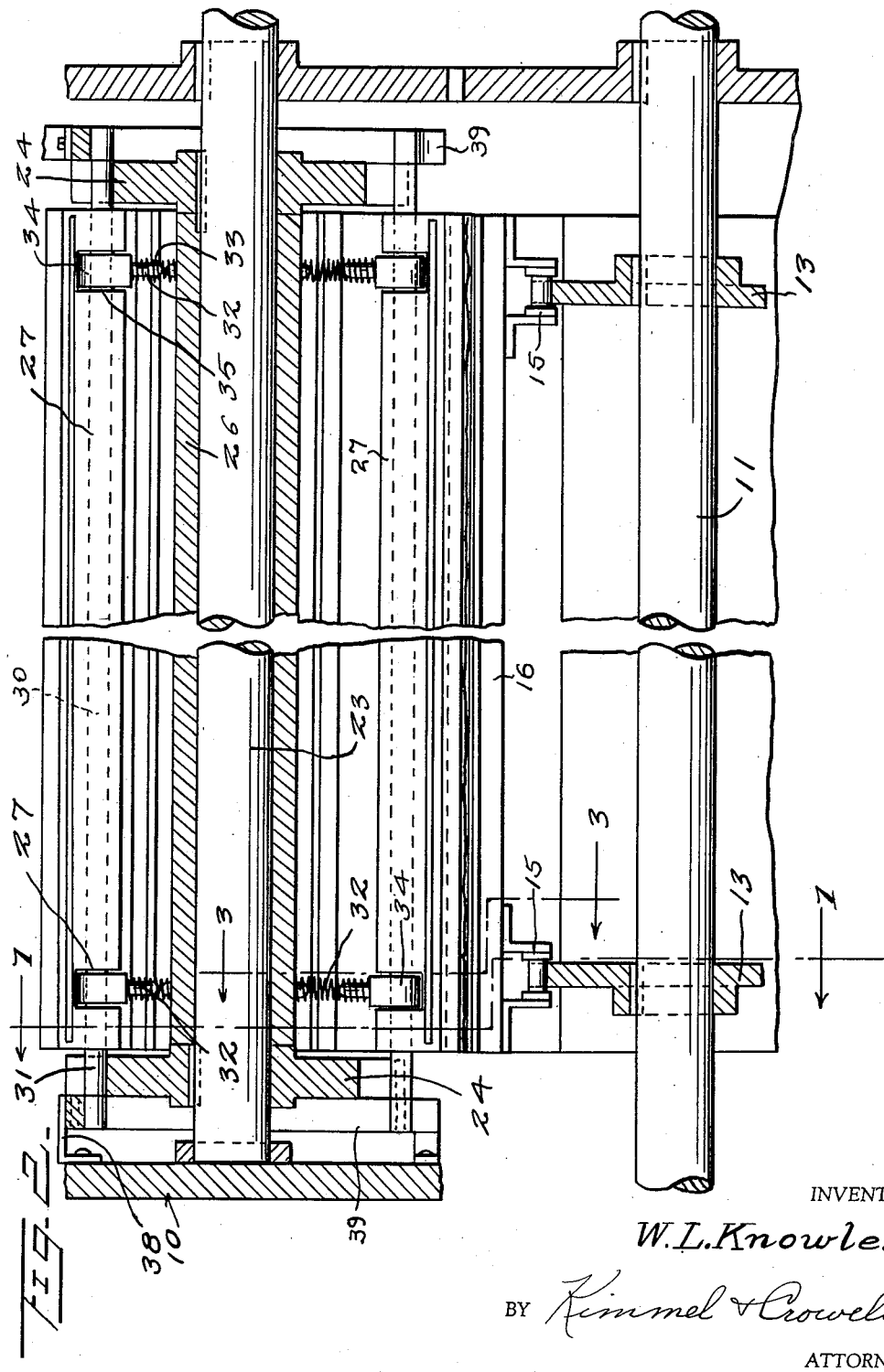

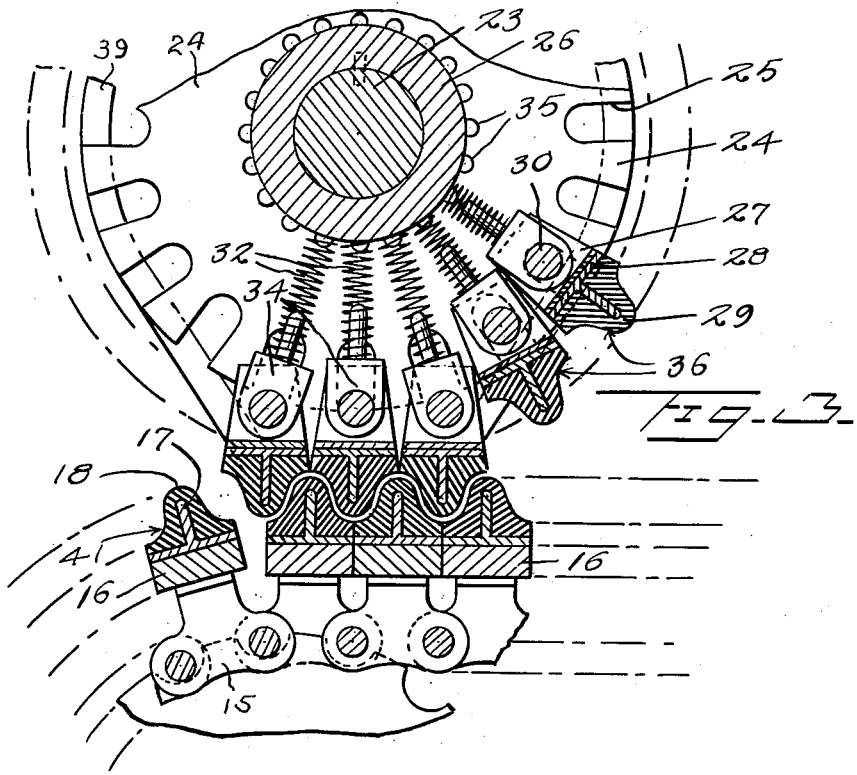
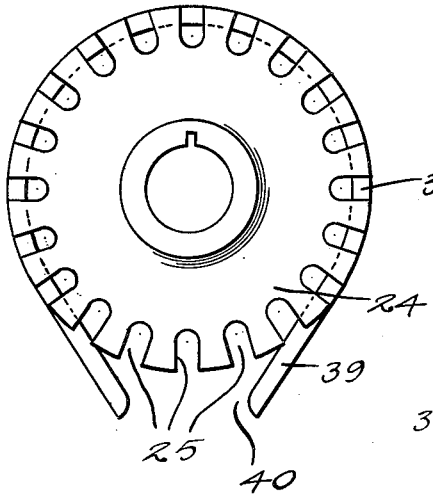
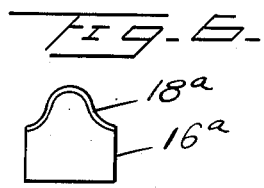
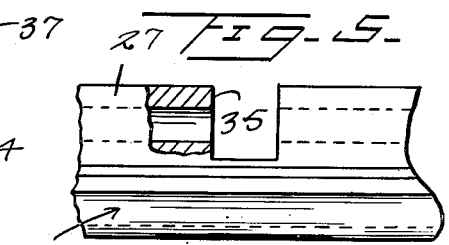

United States Patent Office 2,759,506
Patented Aug. 21, 1956

2,759,506

ROTARY MACHINE FOR MAKING CORRUGATED WOOD

William Lee Knowles, Augusta, Ga., assignor to Coru-Ply Corporation, Murfreesboro, N. C., a corporation of North Carolina Application November 10, 1953, Serial No. 391,259

9 Claims. (Cl. 144—254)

This invention relates to a reverse curve forming machine of the rotary type.

An object of this invention is to produce a machine embodying a rotary corrugating means cooperating with an endless or chain corrugating means for producing a corrugated lamination formed of a plurality of adhesively secured together plies.

Another object of this invention is to provide in combination a rotary and an endless corrugating means with cam means cooperating with said endless corrugating means to produce a laminated sheet in a continuous process.

A further object of this invention is to provide in combination a rotary and an endless corrugating means, with the rotary corrugating means including a cam means for effecting engagement and disengagement of the rotary cam means relative to the endless corrugating means.

With the above and other objects in view, my invention consists in the arrangement, combination and details of construction disclosed in the drawings and specification and then more particularly pointed out in the appended claims.

In the drawings:

Figure 1 is a sectional view taken on the line 1—1 of Figure 2 showing a reverse curve forming machine constructed according to an embodiment of this invention.

Figure 2 is a sectional view partly broken away taken on the line 2—2 of Figure 1.

Figure 3 is a fragmentary sectional view taken on the line 3—3 of Figure 2.

Figure 4 is an end elevation of the rotary corrugating member with the corrugating bars removed and showing the bar retracting cam.

Figure 5 is a fragmentary side elevation partly broken away of one of the rotary corrugating bars.

Figure 6 is an end elevation of a modified form of corrugating or die bar.

Referring to the drawings, the numeral 10 designates generally a frame structure which has mounted in the lower portion thereof a pair of sprocket shafts 11 and 12 on which pairs of sprockets 13 and 14 are secured. A chain 15 is trained about the sprockets 13 and 14 and a plurality of elongated bars 16 are secured to the links of the chains 15 and extend transversely of the frame structure 10.

The bars 16 have secured to the outer sides thereof T-shaped core forming or corrugating bars 17 which are covered by means of a rubber or yieldable covering 18. A plate 19 is fixed in the frame 10 and is disposed between the upper and lower parallel runs of the chains 15. The plate 19 is provided with upper and lower rails 20 and 21 respectively on which the rollers 22 carried by the chain 15 are adapted to movably engage. An upper shaft 23 is journalled transversely of the frame 10 at the leading end of the machine and subsequently above the forward shaft 11.

The shaft 23 has fixed thereto adjacent the opposite ends thereof a pair of radially slotted wheels 24 having a plurality of radially disposed slots 25. A sleeve 26 is disposed on the shaft 23 between the wheels 24. A plurality of elongated bars 27 are disposed between the wheels 24, and the bars 27, as shown in Figure 3, have secured to the outer side thereof T-shaped bars 28, and the bars 28 have secured thereto a rubber covering 29.

Each bar 27 has extending longitudinally therethrough a rod 30 which projects beyond the ends of the bar 27 and has a roller 31 on each end thereof loosely engaging in the radial slots 25. The rollers 31 with the ends of the shafts or rods 30 also project beyond the outer sides of the wheels 24, the purpose for which will be hereinafter described.

The corrugating bars which are formed by the bars 27 and 28 and the covering 29 are constantly urged outwardly to pressure applying position by means of springs 32 which engage about a stud 33 carried by an apertured block 34. The block 34 loosely engages in a slot 35 formed in the bar 27 and shaft or rod 30 loosely engages through the apertured block 34.

Sleeve 26 is also provided with a plurality of short studs 35 about which the inner end of each spring 32 engages. The corrugating bars, generally indicated by the numeral 36, are retracted to inoperative position for the major portion of each revolution of the wheels 24 by means of a pair of substantially horseshoe shaped stationary cams 37 which are fixed as at 38 to the frame 10.

Each cam 37 is formed with a semi-circular loop portion terminating in a pair of downwardly convergent straight portions 39 which are spaced apart at their lower open ends as indicated at 40 so that the lower ones of the corrugating bars 36 will be released from the cams 37 and permitted under tension of the springs 32 to move downwardly into pressure applying position with the confronting movable corrugating bars generally indicated at 41 and formed of bars 16 and 17 with covering 18.

As shown in Figures 1 and 3 there will be substantially three of the corrugating bars 36 in pressure applying position at one time, and as shaft 23 with wheels 24 rotates the wheels on the trailing side of the rotary corrugating member will be moved upwardly and radially inwardly by the cams 37.

In Figure 6, there is shown a modified form of corrugating or die bar wherein the bar 16a is formed as a single element having a rubber or resilient covering 18a. The bars 36 may also be formed after the manner shown in Figure 6.

In the use and operation of this machine the laminated sheet indicated at S in Figure 1, is moved over a table or guide T at the leading end of the machine. As the endless corrugating member moves rearwardly on the upper run thereof and rotary corrugating member moves counterclockwise as viewed in Figure 1, the laminated sheet will be pressed between the lower corrugating bars 41 and the confronting released corrugating bars 36 of the rotary corrugating member.

The corrugated sheet which will be released from the rotary corrugating member will move rearwardly or to the right as viewed in Figure 1, and may be removed from the endless corrugating bars 41 at the rear of the machine.

The machine hereinbefore described is capable of producing a laminated core or corrugated element in a continuous operation.

The heat which is used in this machine is of such a degree or temperature that the heat will set the wood by fusing the lignin or moisture in the cells. The temperature will vary within a range of a minimum of 260° F. and a maximum of approximately 325° F. There are a number of factors which govern the degree of heat and the time of application of heat and pressure. These factors are, the thickness, character and moisture content of the paper, the thickness, viscosity and character of the adhesive, the density of the wood fibers, and the moisture content of the wood. The time of application of the pressure and heat is between ten and twenty seconds, but with certain types of adhesives the time may be very materially reduced.

What is claimed is:

1. A reverse curve forming machine comprising an endless corrugating means including a plurality of elongated corrugating bars, a rotary corrugating means confronting the leading end of said endless corrugating means, said rotary corrugating means comprising a shaft, a pair of spaced wheels fixed to said shaft, said wheels having radially disposed slots opening through the periphery thereof, a plurality of elongated corrugating bars between said wheels, rollers projecting from the ends of said latter named bars loosely engaging in said slots, spring means constantly urging said bars outwardly to pressure applying position, and a stationary substantially horseshoe shaped cam on the outer side of each wheel engageable with said rollers, the open portion of each cam confronting said endless corrugating means whereby said latter named bars will be moved by said spring means to interengaging position with respect to said first-named bars during a portion of the rotation of said rotary corrugating means and will be moved inwardly relative to said wheels during the remaining portion of rotation of said rotary corrugating means.

2. In combination, an endless corrugating means, and a rotary corrugating means confronting said endless corrugating means, each corrugating means including elongated corrugating bars, spring means constantly urging said bars of said rotary corrugating means to pressure applying position, rollers projecting from the opposite ends of said bars of said rotary corrugating means, and a pair of horseshoe shaped cams engaging said rollers for retracting the bars of said rotary corrugating means for a portion of the rotation thereof, and releasing said latter named bars for another portion of the rotation thereof.

3. A reverse curve forming machine comprising an endless corrugating means, a rotary corrugating means, and operating means therefor, said rotary corrugating means comprising a shaft, a pair of wheels fixed to said shaft having radial slots opening through the periphery thereof, corrugating bars between said wheels, rollers projecting from the ends of said bars slidably engaging in said slots, said rollers also projecting through the slots of said wheels, spring means constantly urging said bars radially outwardly to pressure applying position, and stationary cam means engaging said rollers for retracting said bars to inoperative position for the major portion of the rotation of said wheels and bars.

4. A reverse curve forming machine comprising a plurality of parallel corrugating bars, endless chains fixed to said bars, a pair of sprockets for each chain, means for rotating said sprockets, a pair of radially slotted wheels, a plurality of circumferentially arranged corrugating bars, means carried by said latter named bars loosely engaging in the slots of said wheels, means constantly urging said bars outwardly to pressure applying position, and means for retracting said bars during a portion of the rotation thereof.

5. A reverse curve forming machine comprising a lower pair of horizontal shafts, sprockets on said shafts, chains about said sprockets, a plurality of elongated parallel corrugating bars carried by said chains, operating means connected with one of said shafts, a third shaft parallel with said pair of shafts, a pair of radially slotted wheels fixed to said third shaft, a plurality of circumferentially arranged spring-pressed corrugating bars having means at each end thereof loosely engaging in the slots of said wheels, said latter named bars being biased radially outward to pressure applying position, said latter named bars during a minor portion of the rotation thereof interengaging with said first-named bars, and means retracting said last-named bars during the remaining portion of the rotation thereof.

6. A reverse curve forming machine as set forth in claim 1 wherein said spring means are disposed at spaced intervals between said wheels.

7. In combination, an endless corrugating means, a rotary corrugating means confronting said endless corrugating means, each corrugating means including elongated corrugating bars, means constantly urging said bars of said rotary corrugating means radially outwardly toward their respective pressure applying position, means projecting from opposite ends of said bars of said rotary corrugating means, a stationary U-shaped cam means engaging said projecting means for retracting said bars of said rotary corrugating means during a portion of the rotation thereof, said cam means releasing said bars of said rotary corrugating means during another portion of the rotation thereof.

8. In combination, an endless corrugating means, a rotary corrugating means, means for drivng said first and second named corrugating means, each corrugating means including a plurality of elongated corrugating bars, means constantly tending to radially displace outwardly said bars of said rotary corrugating means, stationary U-shaped means holding said bars of said rotary corrugating means in retracted position during a portion of the rotation thereof, said last-named means being inoperative during a second portion of the rotation of said retracted bars whereby said retracted bars are released for radial movement away from said rotary corrugating means.

9. In combination, an endless corrugating means, and a rotary corrugating means confronting said endless corrugating means, said endless corrugating means comprising a plurality of endless chains, sprockets for said chains, a set of elongated corrugating bars fixed to the links of said chains, means between said sprockets supporting the upper runs of said chains, said rotary corrugating means comprising a shaft, a pair of radially slotted wheels fixed to said shaft, a second set of elongated corrugating bars carried by said wheels, springs between said wheels constantly urging said bars of said second set outwardly to pressure applying position, projections at each end of said bars of said second set extending laterally through said slots, and stationary substantially U-shaped cams at each end of said bars of said second set engaging said projections for restraining said bars of said second set against outward movement for the major portion of each rotation thereof, and releasing said bars of said second set for a minor portion of the rotation thereof for radial movement outwardly to pressure applying position.

References Cited in the file of this patent

UNITED STATES PATENTS

| | | |
|---|---|---|
| 785,786 | Wolff | Mar. 28, 1905 |
| 2,350,996 | Atkinson | June 13, 1944 |
| 2,447,784 | Wood | Aug. 24, 1948 |
| 2,640,517 | De Mello | June 2, 1953 |